(12) United States Patent
Tsai

(10) Patent No.: US 7,825,767 B2
(45) Date of Patent: Nov. 2, 2010

(54) SYSTEM FOR SETTING SHUTDOWN VOLTAGE OF ELECTRONIC DEVICE

(75) Inventor: Jen-Sheng Tsai, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 581 days.

(21) Appl. No.: 11/940,878

(22) Filed: Nov. 15, 2007

(65) Prior Publication Data

US 2009/0002122 A1   Jan. 1, 2009

(30) Foreign Application Priority Data

Jun. 29, 2007   (CN) ............... 200710200965

(51) Int. Cl.
*H01C 7/10* (2006.01)
(52) U.S. Cl. ............ 338/20; 338/22 R; 323/283; 320/119
(58) Field of Classification Search .......... 338/20, 338/21, 22 R; 323/283, 285; 320/119, 138, 320/150, 5
See application file for complete search history.

(56) References Cited

U.S. PATENT DOCUMENTS 3,644,864 A * 2/1972 Hirsbrunner et al. .......... 338/25
3,673,538 A * 6/1972 Faxon .......................... 338/25
5,698,970 A * 12/1997 Stanojevic ................. 323/223
6,750,915 B2   6/2004 Kaku
6,859,013 B2 * 2/2005 Howard et al. .............. 320/139

FOREIGN PATENT DOCUMENTS

CN   1630130 A   6/2005

\* cited by examiner

*Primary Examiner*—Kyung Lee
(74) *Attorney, Agent, or Firm*—Jeffrey T. Knapp

(57) ABSTRACT

A system for setting a shutdown voltage for an electronic device having a power source with an internal resistor includes a temperature sensing module and a processing module. The temperature sensing module is configured for measuring a temperature of the power source, and the temperature sensing module includes a reference resistor with invariable resistance, and generates a reference voltage across the reference resistor based on the temperature of the power source. The processing module is configured for generating a voltage across the internal resistor of the power source based on the temperature of the power source, and setting the shutdown voltage of the electronic device according to the reference voltage and the voltage across the internal resistor.

7 Claims, 3 Drawing Sheets

| TEMPERATURE (°C) | RESISTANCE (KΩ) |
| --- | --- |
| 0 | 158.2144 |
| 10 | 95.2267 |
| 20 | 59.0647 |
| 25 | 47.0000 |
| 30 | 37.6431 |
| 40 | 24.5907 |

FIG. 2

| TEMPERATURE (°C) | RESISTANCE (mΩ) |
|---|---|
| 0 | 120 |
| 10 | 100 |
| 20 | 80 |
| 40 | 60 |

FIG. 3

SYSTEM FOR SETTING SHUTDOWN VOLTAGE OF ELECTRONIC DEVICE

BACKGROUND

1. Field of the Invention

The present invention relates to power source technology and, particularly, to a system for setting a shutdown voltage of an electronic device.

2. Description of Related Art

At present, shutdown voltages for electronic devices are fixed. The shutdown voltages of the electronic devices are related to output voltages of built-in power sources of the electronic device. As is known, the resistance of an internal resistor in a power source may vary with changing temperatures of the power source. Output voltage of the power source is affected by the variation of the resistance of the internal resistor. Use efficiency of the power source is low and lifetime of the power source is decreased due to the fixed shutdown voltage of the power source.

What is needed, therefore, is to provide a system for setting a shutdown voltage of a electronic device in which the above problem is eliminated or at least alleviated.

SUMMARY

In a present embodiment, a system for setting a shutdown voltage of an electronic device having a power source with an internal resistor includes a temperature sensing module and a processing module. The temperature sensing module is configured for measuring a temperature of the power source, and the temperature sensing module includes a reference resistor with invariable resistance, and generates a reference voltage across the reference resistor based on the temperature of the power source. The processing module is configured for generating a voltage across the internal resistor of the power source based on the temperature of the power source, and setting the shutdown voltage of the electronic device according to the reference voltage and the voltage across the internal resistor.

Advantages and novel features will become more apparent from the following detailed description of the present system for setting a shutdown voltage of an electronic device, when taken in conjunction with the accompanying drawings.

BRIEF DESCRIPTION OF THE DRAWINGS

Many aspects of the present system for setting a shutdown voltage of an electronic device can be better understood with reference to the following drawings. The components in the drawings are not necessarily drawn to scale, the emphasis instead being placed upon clearly illustrating the principles of the present system for setting a shutdown voltage of an electronic device. Moreover, in the drawings, like reference numerals designate corresponding parts throughout the several views.

FIG. 2 is a relationship diagram between the temperature and the resistance of a temperature sensing module according to the present embodiment.

FIG. 3 is a relationship diagram between the temperature and the internal resistance of the power source according to the present embodiment.

DETAILED DESCRIPTION OF EMBODIMENTS

Figure 1:
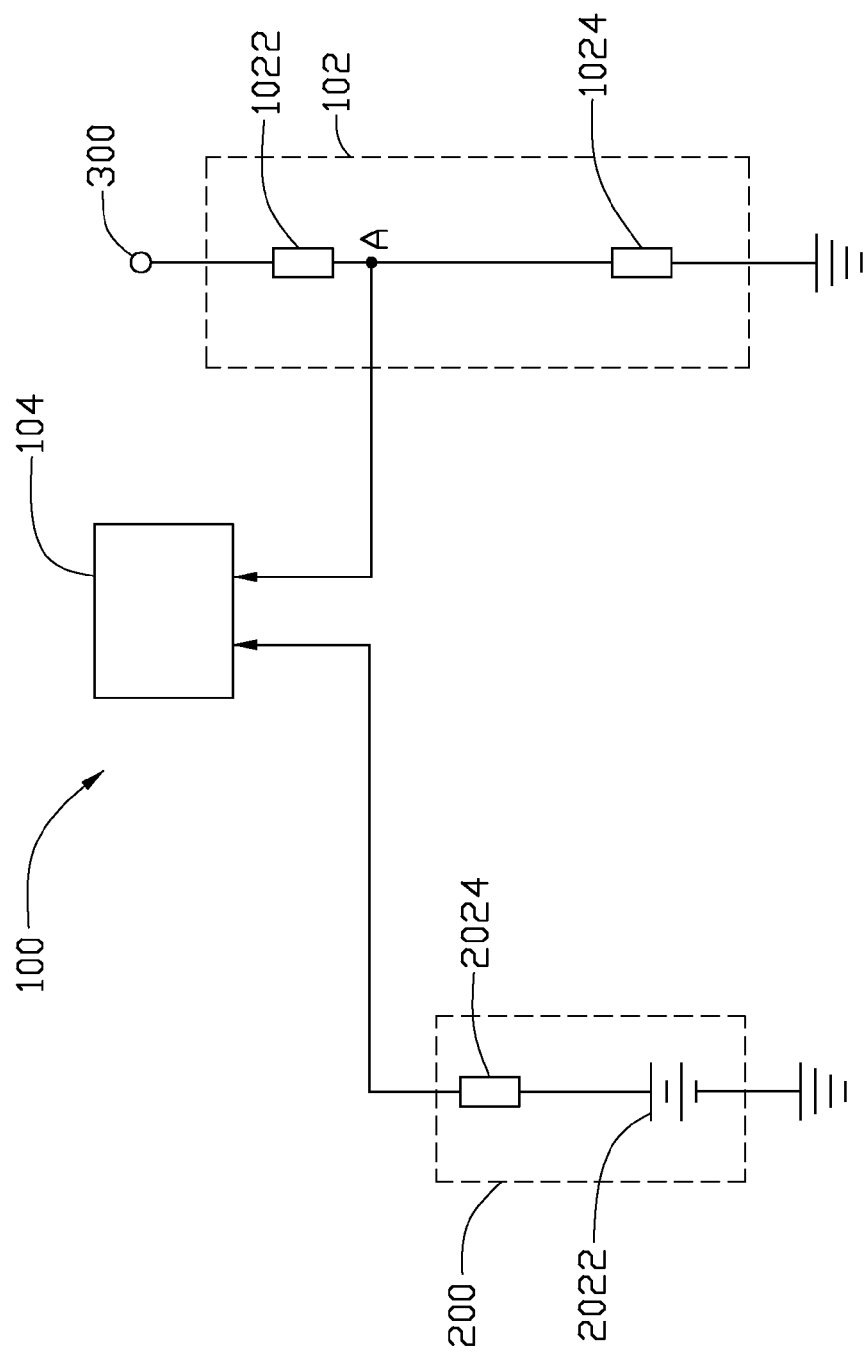
FIG. 1 is a circuit diagram of a system for setting a shutdown voltage of an electronic device according to a present embodiment.

Reference will now be made to the drawings to describe at least one preferred embodiment of the present system for setting a shutdown voltage of an electronic device.

Referring to FIG. 1, a system 100 for setting a shutdown voltage of an electronic device (not shown), according to a present embodiment, is shown. The electronic device includes a power source 200 (e.g., a battery) for the electronic device, such as a digital camera or a camcorder. An equivalent circuit of the power source 200 is an ideal voltage source 2022 and an internal resistor 2024 connected in series. A resistance of the internal resistor 2024 is designated as r. The system 100 includes a temperature sensing module 102 and a processing module 104.

The temperature sensing module 102 includes a temperature sensing element 1022 and a reference resistor 1024 with invariable resistance thereof. One terminal of the temperature sensing element 1022 is connected to an internal power source 300 (e.g., a power source chip built into the electronic device) of the electronic device, and another terminal of the temperature sensing element 1022 is grounded via the reference resistor 1024. The temperature sensing element 1022 is attached to a surface of the power source 200 or is placed adjacent to the power source 200 so as to accurately measure the temperature of the power source 200. In this way, a resistance of the temperature sensing element 1022 changes as the temperature of the power source 200 changes. In this present embodiment, the temperature sensing element 1022 is an NTC (negative temperature coefficient) model NCP15WB473J03RC thermistor. Resistance of the NTC thermistor decreases when the temperature increases. The temperature characteristic of this type of NTC thermistor may be referred to in the product specification thereof. As an example, a characteristic table of a temperature range from 0° C. to 40° C. of the NTC thermistor is shown in FIG. 2. The resistance of the NTC thermistor is about 47 thousand ohms (KΩ) at the normal temperature (25° C.).

The resistance of the reference resistor 1024 is equal to that of the NTC thermistor at the normal operating temperatures, that is, the resistance of the reference resistor 1024 is about 47 KΩ. A voltage V2 at the point A is the voltage drop across the reference resistor 1024, as shown in FIG. 1 and is expressed as: $V2=R2 \times Vc/(R1+R2)$, where R2 is a resistance of the reference resistor 1024, and Vc is a voltage of the internal power source 300 of the electronic device, and R1 is a resistance of the NTC thermistor. Since R1 of the NTC thermistor changes as the temperature of the power source 200 changes, the voltage V2 changes as well. Thus, the voltage V2 at the point A corresponds to the temperature of the temperature sensing element 1022, which in turn corresponds to the temperature of the power source 200. That is, the voltage V2 as a reference voltage (hereafter cited as "reference voltage V2") corresponds to the temperature of the power source 200.

The processing module 104 is a digital signal processing unit or a chip capable of processing digital signals. A critical voltage V, a maximum-load current I and a voltage group Vr across the internal resistor 2024 of the power source 200 at different temperatures under the maximum-load current I are pre-built into the processing module 104. When the shutdown voltage of the electronic device at a temperature of the power source 200 is set, the processing module 104 measures the reference voltage V2 at the point A, thus reading the voltage Vr across the internal resistor 2024 of the power source 200 corresponding to the current temperature of the power source 200, and determines the current temperature of the power source 200. The processing module 104 sets the shutdown voltage V0 of the electronic device as V0=Vr+V to compensate for influence of the temperature of the power source 200 on output voltage of the power source 200. In this present embodiment, the critical voltage V is 1.8 volts, and the maximum-load current I is 1.5 amperes. It is understood that the voltage group Vr can be obtained by measuring the voltage across the internal resistor 2024 of the power source 200 experimentally at different temperatures and program the voltage group Vr into the processing module 104 by manufacturers.

At temperatures of 0° C., 10° C., 20° C., and 40° C., the relationships between the temperature of the power source 200 and resistance of the internal resistor 2024 (seen in FIG. 3) are taken as examples for better understanding of the system for setting the shutdown voltage for the electronic device.

When the temperature of the power source 200 is 0° C., resistance of the internal resistor 2024 of the power source 200 is about 120 milli ohms (mΩ). The resistance of the temperature sensing element 1022 is about 158 KΩ at the temperature of 0° C. The voltage Vr across the internal resistor 2024 under the maximum-load current I is expressed as: Vr=I×r≈1.5×0.12=0.18 (volts). Thus, the reference voltage V2 of the point A is expressed as: V2=R2×Vc/(R1+R2)≈47×Vc/(158+47)=0.22×Vc (Volts). The processing module 104 sets the shutdown voltage V0 of the electronic device as V0=V+Vr≈1.8+0.18=1.98 (volts) according to the reference voltage V2 at the point A.

When the temperature of the power source 200 is 10° C., a resistance of the internal resistor 2024 of the power source 200 is about 100 mΩ. The resistance of the temperature sensing element 1022 is about 95 KΩ at the temperature of 10° C. The voltage Vr across the internal resistor 2024 under the maximum-load current I is expressed as: Vr=I×r≈1.5×0.1=0.15 (volts). Thus, the reference voltage V2 of the point A is expressed as: V2=R2×Vc/(R1+R2)≈47×Vc/(95+47)=0.33×Vc (Volts). The processing module 104 sets the shutdown voltage V0 of the electronic device as V0=V+Vr≈1.8+0.15=1.95 (volts) according to the reference voltage V2 at the point A.

When the temperature of the power source 200 is 20° C., a resistance of the internal resistor 2024 of the power source 200 is about 80 mΩ. The resistance of the temperature sensing element 1022 is about 59 KΩ at the temperature of 20° C. The voltage Vr across the internal resistor 2024 under the maximum-load current I is expressed as: Vr=I×r≈1.5×0.08=0.12 (volts). Thus, the reference voltage V2 of the point A is expressed as: V2=R2×Vc/(R1+R2)≈47×Vc/(59+47)=0.44×Vc (Volts). The processing module 104 sets the shutdown voltage V0 of the electronic device as V0=V+Vr≈1.8+0.12=1.92 (volts) according to the reference voltage V2 at the point A.

When the temperature of the power source 200 is 40° C., a resistance of the internal resistor 2024 of the power source 200 is about 60 mΩ. The resistance of the temperature sensing element 1022 is about 25 KΩ at the temperature of 40° C. The voltage Vr across the internal resistor 2024 under the maximum-load current I is expressed as: Vr=I×r≈1.5×0.06=0.09 (volts). Thus, the reference voltage V2 of the point A is expressed as: V2=R2×Vc/(R1+R2)≈47×Vc/(25+47)=0.65×Vc (Volts). The processing module 104 sets the shutdown voltage V0 of the electronic device as V0=V+Vr≈1.8+0.09=1.89 (volts) according to the reference voltage V2 at the point A.

Since the shutdown voltage of the electronic device is set based on the temperature of the power source 200, the efficiency and lifetime of the power source 200 are enhanced.

It is to be understood that the above-described embodiment is intended to illustrate rather than limit the invention. Variations may be made to the embodiment without departing from the spirit of the invention as claimed. The above-described embodiments are intended to illustrate the scope of the invention and not restrict the scope of the invention.

What is claimed is:

1. A system for setting a shutdown voltage of an electronic device, the electronic device comprising a power source with an internal resistor, the system comprising:
   a temperature sensing module configured for measuring a temperature of the power source, the temperature sensing module comprising a reference resistor with invariable resistance, and generating a reference voltage across the reference resistor based on the temperature of the power source; and
   a processing module configured for generating a voltage across the internal resistor of the power source based on the temperature of the power source, and setting the shutdown voltage of the electronic device according to the reference voltage and the voltage across the internal resistor.

2. The system as claimed in claim 1, wherein the temperature sensing module further includes a temperature sensing element; the temperature sensing element is attached to a surface of the power source so as to accurately measure the temperature of the power source; one terminal of the reference resistor is connected to the temperature sensing element, and the other terminal of the reference resistor is grounded.

3. The system as claimed in claim 2, wherein the resistance of the reference resistor is equal to that of the temperature sensing element at normal operating temperature.

4. The system as claimed in claim 3, wherein the temperature sensing element is a negative temperature coefficient thermistor.

5. The system as claimed in claim 1, wherein the processing module includes a critical operating voltage, a maximum-load current, a voltage group comprising voltage drops across an internal resistor of the power source at different temperatures under the maximum-load current built therein.

6. The system as claimed in claim 5, wherein the voltage across the internal resistor of the power source is one of the voltage group at a sensed temperature of power source; the sensed temperature of the power source is measured according to the reference voltage of the reference resistor of the temperature sensing module.

7. The system as claimed in claim 6, wherein the shutdown voltage is equal to the critical operating voltage plus the voltage across the internal resistor of the power source under the maximum-load current.

\* \* \* \* \*